United States Patent [19]
Hoskinson

[11] Patent Number: 5,809,909
[45] Date of Patent: Sep. 22, 1998

[54] METHOD AND APPARATUS FOR REMOVING PARTICULATE MATERIAL FROM A GAS

[75] Inventor: Gordon H. Hoskinson, Floral Park, N.Y.

[73] Assignee: Amko Incinerator Corp, Woodmere, N.Y.

[21] Appl. No.: 529,505

[22] Filed: Sep. 18, 1995

[51] Int. Cl.$^6$ .................................................. F23J 15/00
[52] U.S. Cl. ........................................ 110/215; 110/216
[58] Field of Search .................................. 110/215, 216, 110/217

[56] References Cited

U.S. PATENT DOCUMENTS

| | | |
|---|---|---|
| 640,796 | 1/1900 | Neuhs . |
| 985,330 | 1/1911 | Derrig . |
| 997,762 | 7/1911 | Derrig . |
| 1,112,860 | 10/1914 | Smith . |
| 1,267,023 | 5/1918 | Wedge . |
| 1,521,348 | 12/1924 | Ambruster . |
| 1,866,192 | 7/1932 | Coutant . |
| 2,133,819 | 10/1938 | Howse et al. . |
| 3,815,336 | 6/1974 | Rigo . |
| 3,870,484 | 3/1975 | Berg . |
| 4,027,602 | 6/1977 | Mott . |
| 4,212,656 | 7/1980 | Lube . |
| 4,216,002 | 8/1980 | Rosenblad . |
| 4,291,633 | 9/1981 | Hoskinson ............................... 110/235 |
| 4,417,546 | 11/1983 | Hoskinson ................................ 122/20 |
| 4,532,871 | 8/1985 | Van Gasselt . |
| 4,674,417 | 6/1987 | Hoskinson . |
| 4,796,546 | 1/1989 | Herstad et al. . |
| 4,883,003 | 11/1989 | Hoskinson . |
| 4,891,052 | 1/1990 | Belin et al. . |
| 4,992,085 | 2/1991 | Belin et al. . |

FOREIGN PATENT DOCUMENTS

| | | |
|---|---|---|
| 159881 | 4/1904 | Germany . |
| 394895 | 5/1924 | Germany . |

*Primary Examiner*—John T. Kwon
*Attorney, Agent, or Firm*—Andrus, Sceales, Starke & Sawall

[57] ABSTRACT

A scrubber for user in an incineration system to remove particulate materials and provide complete combustion of the combustion gas. The scrubber defines a scrubber chamber having an inlet through which hot combustion gas is introduced and having an outlet for discharge of the gas. Suspended within the scrubber chamber are a plurality of elongated plates composed of a temperature resistant metal, such as Inconel. The plates are arranged in a pattern to provide a tortuous path of flow for the combustion gas through the chamber, and prevent direct flow from the inlet to the outlet. In a preferred form of the invention, the plates are arranged in rows with the spacing between plates in one row being aligned with plates in an adjacent row. As the combustion gas flows through the chamber, the particulate material will migrate to, and collect on, the front and rear plate surfaces. During periods of intermittent use of the incinerator, the expansion and contraction of the plates will cause the deposited particulate material to flake from the plates for collection in a collection bin. The configuration and arrangement of the plates also promotes mixing of air with the combustion gas to promote complete combustion of the combustibles.

8 Claims, 5 Drawing Sheets

METHOD AND APPARATUS FOR REMOVING PARTICULATE MATERIAL FROM A GAS

BACKGROUND OF THE INVENTION

In a pyrolytic incineration system waste material, such as garbage or trash, is combusted in an incineration chamber, and air is introduced into the incineration chamber in a volume less than the air requirements at rated capacity, so that the low air volume results in only partial combustion and partial pyrolytic gasification of the waste. In a typical pyrolytic incineration system, temperatures in the range of about 1200° to 1500°F. are achieved in the incineration chamber.

The partially combusted gases are then passed through a thermal reactor where additional air is supplied to the combustion gas. The thermal reactor functions to provide turbulent conditions to mix the air with the combustion gas and the mixture is then delivered to a secondary combustion chamber where complete combustion of the combustible gas is achieved.

Depending on the nature of the waste material being incinerated, the gas being discharged from the system may contain substantial particulate material, such as fly ash. To meet emission requirements, it is often necessary to incorporate a scrubber in the incineration system in order to minimize the emission of the particulate material. Typical scrubbers, as used with an incineration system, may take the form of cyclone scrubbers or venturi scrubbers. Both of these scrubbing systems normally also include a bag house to collect the fine particulate material that is not removed by the scrubber. Cyclone and venturi type scrubbers have high horsepower requirements, up to perhaps 600 horsepower, so that not only is the initial capital expenditure for this equipment very substantial, but the maintenance and operating expenses are also extremely high. Further, the collection bags as used in the bag house require frequent replacement and it is also necessary to incorporate a heat exchanger in the system to reduce the temperature of the hot combustion gases before they enter the bag house. Because of the substantial capital expenditure along with the high maintenance and operating costs, the incorporation of scrubbers with smaller incineration systems as used with hospitals, restaurants, seaports, and the like, can be cost prohibitive, thus resulting in incineration systems not being used for waste disposal in these situations.

SUMMARY OF THE INVENTION

The invention is directed to a method and apparatus for removing particulate material from a gas, and more particularly to a scrubber for an incineration system, which will effectively remove particulate material, such as fly ash, from the hot combustion gas and will also achieve more complete combustion of the combustibles in the gas.

The scrubber of the invention defines a scrubber chamber having an inlet through which hot combustion gas from a secondary combustion chamber is introduced, and having an outlet through which the gas is discharged. Suspended within the scrubber chamber are a plurality of elongated metal plates or baffles composed of a heat resistant metal or alloy, such as Inconel. The plates are arranged in a pattern to provide a tortuous path of flow for the combustion gases through the chamber, and prevent the direct flow of the gases from the inlet to the outlet. The arrangement and configuration of the plates results in the high velocity flow of combustion gas between adjacent plates and areas of low velocity or stagnation adjacent the front and rear surfaces of the plates, causing heavier particulate material to fall by gravity along the front and rear surfaces for collection in a collection bin, while lighter weight particulate material will collect on the front and rear surfaces of the plates.

As the incineration system is normally used intermittently, the plates tend to expand and contract during service, and this expansion and contraction will loosen and dislodge the collected particulate material from the plates and the dislodged material will be collected in the bin. Thus, the particulate material will automatically be collected on the plates and discharged, and it is not necessary to provide any auxiliary equipment for periodically removing the collected particulate material from the plates.

In a preferred form of the invention, the plates are suspended in the scrubber chamber and arranged in a series of parallel rows, with the flat faces of the plates being normal or perpendicular to the gas flow. The plates in each row are spaced apart a distance generally equal to the width of the plates, and the plates in each row are staggered with respect to plates in adjacent rows. Thus, a portion of the combustion gas entering the scrubber chamber will impinge on the front faces of the plates in the first row, and while a second portion of the gas will flow at a high velocity through the spaces between the plates in the first row will then impinge against the plates in the second row. This flow pattern is continued throughout the length of the scrubber chamber, thus causing the gas to flow in a tortuous non-direct path through the chamber.

With the configuration and arrangement of the plates, the particulate material, such as fly ash, is effectively removed from the combustion gas and is collected on the faces of the plates. Due to the contraction and expansion of the plates in service, the deposited particulate material will flake off the plates, and is collected in a bin at the bottom of the chamber. Thus, no cleaning or maintenance of the plates is required, for the particulate material is automatically discharged from the plates.

The tortuous flow path of the gases through the scrubbing chamber, along with the creation of pressure differentials, create more effective mixing of the combustion gas with air that is introduced into the system in the thermal reactor, thus assuring complete combustion of the combustibles in the gas.

As a further advantage, there are no moving parts in the scrubber, and there are no power requirements. This substantially reduces the cost of operation and maintenance over centrifugal or venturi-type scrubbers. Further, power-operated centrifugal and venturi scrubbers generate substantial noise and as the scrubber of the invention has no moving parts, there is no noise generation.

The size and configuration of the plates are arranged so that the gases flowing from the secondary combustion chamber into the scrubber will occupy the entire volume of the scrubber, and will not flow along a restricted path adjacent the upper wall of the scrubber.

In a modified form of the invention, each of the scrubber plates is provided with a central longitudinal passage or duct. The upper end of each longitudinal passage is exposed to the atmosphere, and the plate is provided with a plurality of outlet ports which provide communication between the central passage and the interior of the scrubber chamber. With this construction, the natural draft of the incineration system will draw air into the passage of each of the plates and discharge the air through the ports into the scrubber chamber, thus ensuring complete combustion of the combustibles in the combustion gas.

In a further modified form of the invention, each of the scrubber plates can be provided with a closed flow passage, with the ends of the passage terminating at the upper end of each plate. Water is introduced into one end of the passage and as the water circulates through the passage it is heated, so that water at a temperature of about 450° F. is discharged from the opposite end of each passage and can be used as a supply of steam for heating operations in other portions of the establishment. By proper sizing of the internal passages and/or by control of the volume of flow of the water through the passages, the exiting temperature of the heated water can be controlled so that the exit temperature in all rows of plates, will be approximately the same.

In a further modified form of the invention, both ends of each hollow or tubular scrubber plate are open to the atmosphere so that air will flow by convection through the plates. The flow of air within the plates acts to cool the combustion gas that is flowing through the scrubber chamber. If the incineration system includes a bag house, cooling of the combustion gas by this arrangement can eliminate the auxiliary heat exchanger that is normally required to cool the combustion gas before it enters the bag house.

In certain instances, the combustion of the waste material may generate high levels of concentration of hazardous gases, such as hydrogen chloride, hydrogen sulfide, and the like. As a further feature of the invention, a wet scrubber can be incorporated with the dry scrubber previously described, to remove such hazardous gases, The wet scrubber can include a plurality of upstream rows of hollow scrubber members or baffles, and water is introduced into the hollow interior of the scrubber members and discharged through jets or nozzles in the side edges of the scrubber members, in the form of a mist, into intersecting relation with the hot combustion gas flowing through the wet scrubber chamber., The hot combustion gas will tend to vaporize the mist and the hazardous gas components will be dissolved in the stream and water droplets. The hollow scrubber members in the wet scrubber are followed downstream by a plurality of rows of solid metal scrubber members or baffles and the condensed steam and water droplets, as well as the remaining particulate material, will tend to collect on the front and rear surfaces of the downstream baffles and will flow downwardly along the baffles to a collection site. Thus, the incorporation of the wet scrubber will remove the hazardous gases from the hot combustion gas and prevent the evolution of the hazardous gases into the atmosphere.

Other objects and advantages will appear during the course of the following description.

DESCRIPTION OF THE DRAWINGS

The drawings illustrate the best mode presently contemplated of carrying out the invention.

In the drawings.

DESCRIPTION OF THE ILLUSTRATED EMBODIMENT

Figure 1:
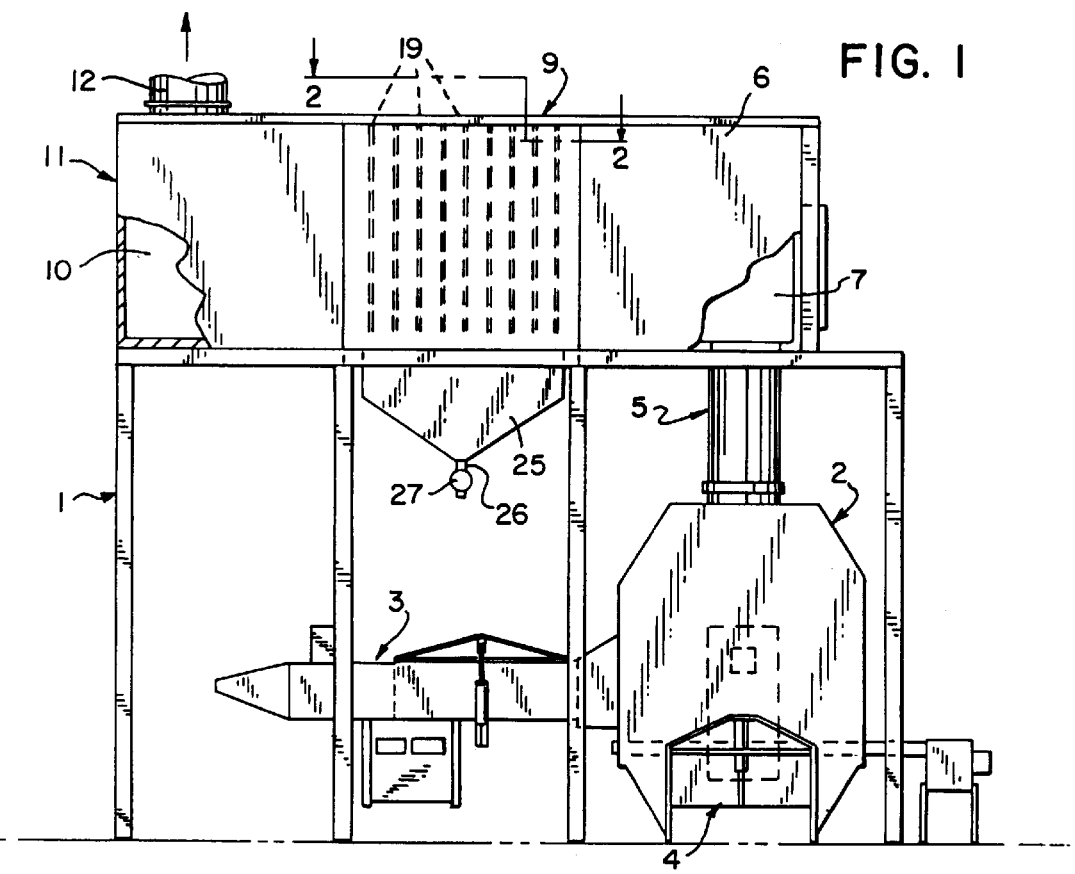
FIG. 1 is a side elevation of a typical incineration system incorporating the scrubber of the invention.

The invention relates to an apparatus for removing particulate material from a gas, and FIG. 1—4 illustrate the invention as utilized in a dry scrubber in an incineration system. The incineration system can be a typical pyrolytic incinerator which includes an outer supporting framework 1, within which is mounted an incinerator 2 that defines a combustion chamber. The waste material, such as garbage or trash, is fed to the combustion chamber via one or more feeding units 3, and ash can be automatically removed from the combustion chamber through operation of an ash removal unit 4. The combustion chamber, feeding unit and ash unit can be constructed as described in U.S. Pat. No. 4,674,417.

The incineration process is preferably a pyrolytic type, in which air is introduced into the combustion chamber in a volume less than about half the air requirements at rated capacity. This low air volume results in partial combustion and partial pyrolytic gasification of the waste material.

The combustion gas is discharged from the combustion chamber through a thermal reactor stack 5, which can also be constructed in accordance with U.S. Pat. No. 4,674,417. In the thermal reactor stack, air is introduced into the stack and mixed with the combustion gas and the mixture is ignited by fuel burners. The function of the thermal reactor stack is to provide additional air for combustion of the partially combusted gas, and to mix the air with the gas so that complete combustion can occur.

The mixture of combustion gas and air is discharged from the stack 5 into a box-shaped secondary combustion unit 6, which defines a combustion chamber 7. The lateral outlet of combustion chamber 7 communicates with an inlet to scrubber chamber 8 of scrubber unit 9, and the outlet of scrubber chamber 8 is connected to a combustion chamber 10 defined by the combustion unit 11. After flowing through the scrubber chamber 8 and combustion chamber 10, the gas is then discharged to the atmosphere through the stack 12.

The invention as illustrated, is directed in particular to the scrubber unit 9, which functions to remove particulate material, such as fly ash, from the hot combustion gas and also functions to provide more effective mixing of air with the combustion gas to achieve complete combustion of the combustibles.

Scrubber unit 9 is generally rectangular in shape, including an upper wall 13, a lower wall 14, and a pair of sidewalls 15 which are connected between the upper wall 13 and lower wall 14. As previously described, the inlet end of the scrubber chamber communicates with secondary combustion chamber 7, while the outlet of the scrubber chamber communicates with the combustion chamber 10.

Each wall 13, 14 and 15 includes an outer steel shell 16 and an inner liner of refractory material 17.

Suspended within the scrubber chamber 8 are a plurality of elongated plates or baffles composed of a heat resistant metal or alloy, such as Inconel, (an alloy composed of approximately 80% by weight of nickel, 14% by weight of chromium, and 6% by weight of iron). In a preferred form of the invention, plates 18 are mounted in a series of vertical rows 19, which extend transversely across the scrubber chamber 8. Each of the plates 18 is generally rectangular in cross-section, having a generally flat front face, a generally flat rear face and a pair of side edges that connect the front and rear faces.

Figure 3:
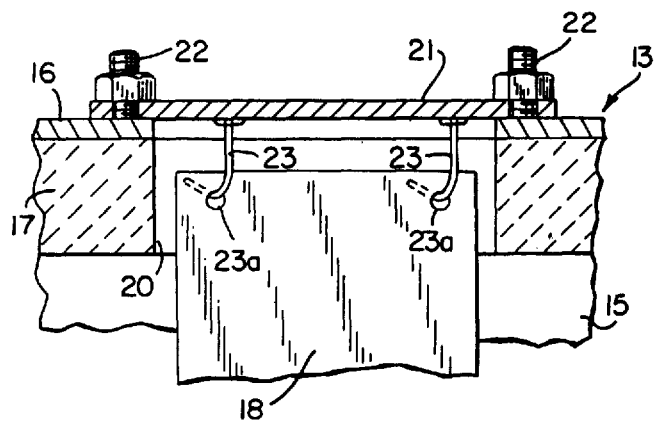
FIG. 3 is a fragmentary vertical section taken along line 3—3 of FIG. 2 showing the manner of suspending a scrubber plate within the scrubber chamber.

As shown in FIG. 3, each plate 18 is individually suspended from the top wall 13. In this regard, the steel shell 16, as well as the refractory liner 17 of upper wall 13, are provided with a aligned openings 20, and the upper end of each plate 18 extends through the aligned openings. A cap or plate 21 is secured to the outer surface of steel shell 16 by bolts 22 and encloses the aligned openings 20. Cap 21 carries a pair of hooks 23 which are engaged with suitable holes 23a in the upper end of the plate 18. With this construction, each plate 18 is freely suspended from the upper wall 13 of the scrubber unit 9.

Figure 2:
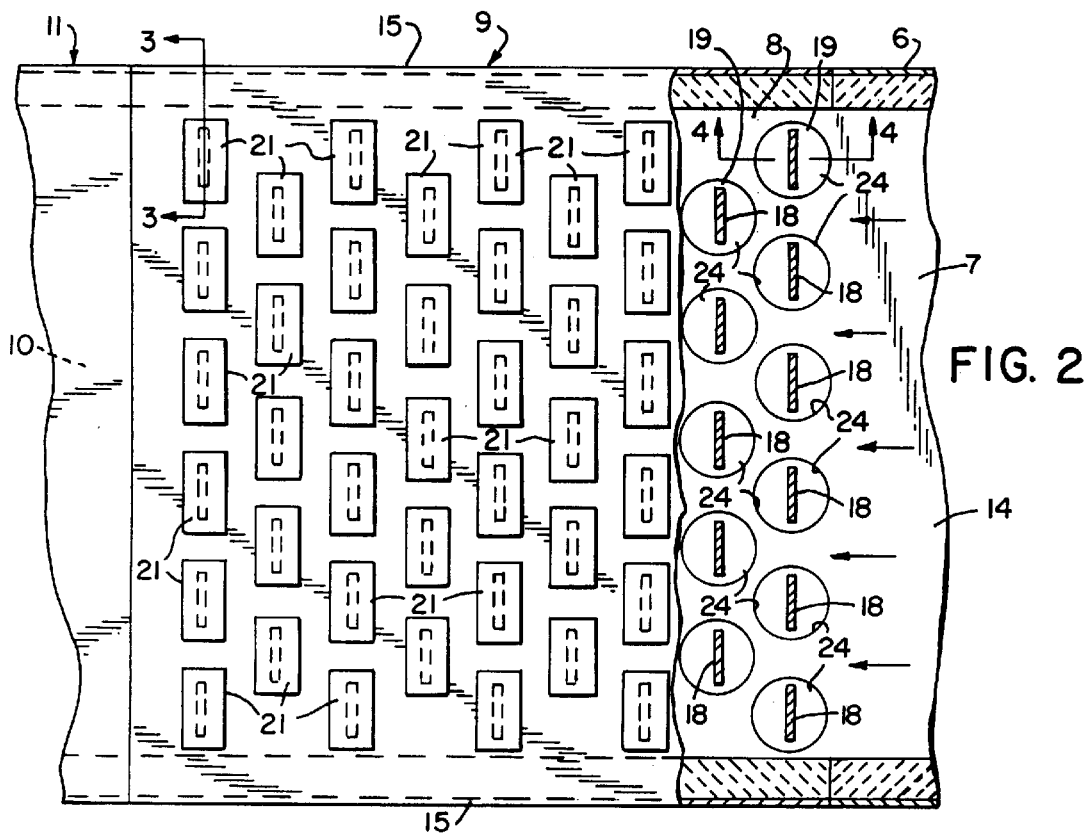
FIG. 2 is a partial top plan view of the incineration system of FIG. 1 with parts broken away on section.
Figure 4:
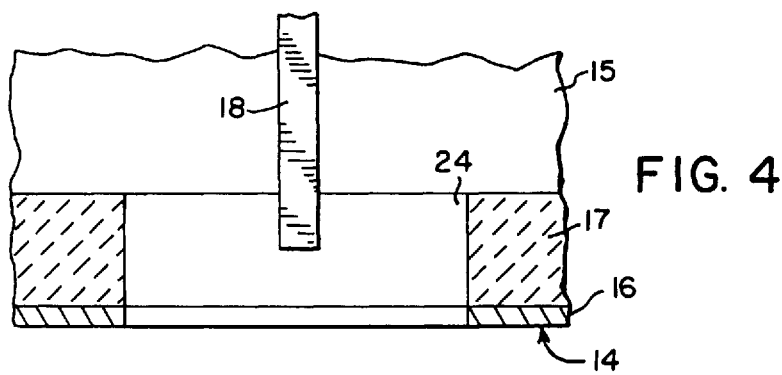
FIG. 4 is a section taken along line 4—4 of FIG. 2.

As illustrated in FIGS. 2 and 4, the steel shell 16 as well as the refractory liner 17 of the lower wall 15, are formed with a plurality of generally circular, aligned openings 24 and the lower end of each plate 18 is freely located within an opening 24.

A typical incineration system is used intermittently, and during use the plates 18 may be exposed to extremely high temperatures in the range of 1800° F. to 2200° F. During periods of non-use, the plates may cool to ambient temperature. The heating and cooling cycles cause expansion and contraction of the plates, and by suspending the plates from the upper wall, this expansion and contraction can be accommodated to prevent warping of the plates.

A tapered bin or hopper 25 is mounted to the lower wall 14 of the scrubber unit, and as will be hereinafter described, serves as a collection site for particulate material being discharged from plates 18. Bin 25 is provided with an outlet conduit 26, and flow through the outlet conduit can be controlled by a conventional valve 27.

As illustrated in FIG. 2, plates 18 extend transversely across the scrubbing chamber 8 with the front and rear faces of the plates being located normal or perpendicular to the gas flow. In practice, the plates or baffles may have a width of about 6 inches, and a thickness of ¼ inch. The plates 18 of each roll are staggered with respect to the plates of adjacent rows, meaning that the spaces between plates in one row are aligned with the plates in adjacent rows, so that the gas flowing through the scrubber chamber 8 will flow in a tortuous path, and cannot flow directly from the inlet to the outlet. The spacing between the side edges of plates 18 in each row is approximately equal to the width of the plates. Thus, if the plates are 6 inches in width, the spacing between adjacent plates in each row will also be 6 inches.

It has been found that the plates 18 at the ends of each row 19 should be spaced slightly from the refractory liner 17 of the sidewalls 15. Generally, a spacing of about 3 inches is preferred. If the side edges of the plates 18 at the ends of each row 19 were in contact with the refractory liner, there could be a temperature differential produced across the plate which could result in warpage of the plate. Thus, it is preferred to space the side edges of the end plates 18 of each row 19 a slight distance from the refractory liner 17.

The hot combustion gas from the secondary combustion chamber 6 will be drawn by the draft of the system through the scrubber chamber 8. In a typical operation, the combustion gases will be at a temperature in the range of about 1800° F. to 2200° F.

Figure 5:
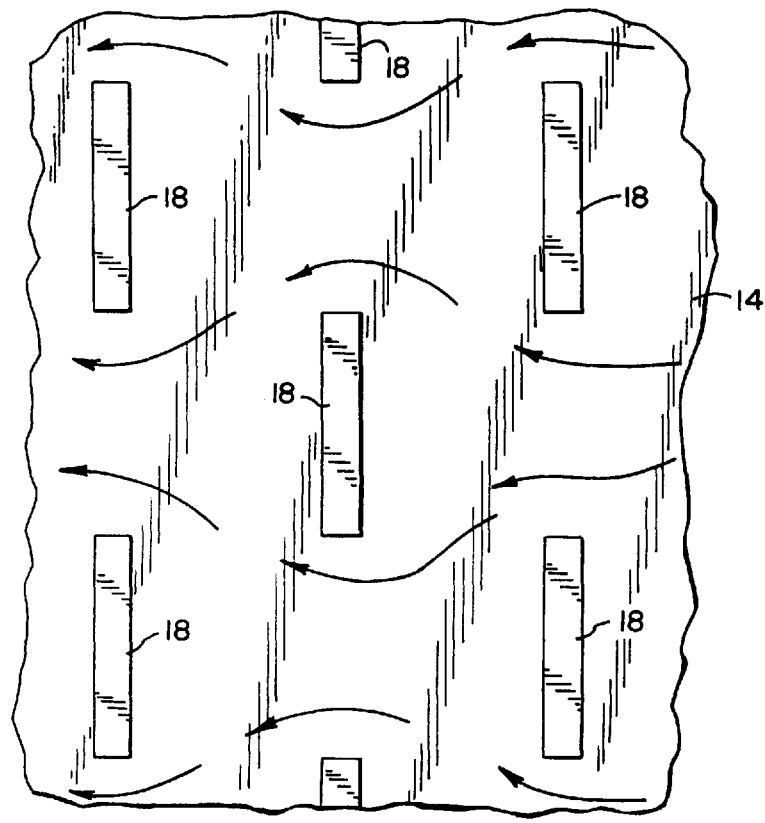
FIG. 5 is a horizontal section illustrating schematically the flow of hot combustion gases through the scrubber chamber.

As the combustion gas enters the scrubber chamber, a portion of the hot gas will engage the front faces of plates 18 in the first or upstream row, while a second portion of the gas will flow through the spaces between the plates and engage the front faces of the plates in the second row, as illustrated in FIG. 5. Thus, the gas flows in a high velocity, tortuous path and areas of low velocity or stagnation are created adjacent the front and rear faces of plates 18. Heavier particulate material in the low velocity areas will fall downwardly by gravity along the front and rear faces of the plates and will be collected in bin 25, while light weight particulate material will adhere to and be collected as a scale on the front and rear faces of the plates.

As the plates 18 expand and contract during heating and cooling by virtue of the intermittent use of the incineration system, the scale will be dislodged and flake off, falling downwardly through the circular openings 24 into the bin 25 for collection. As each opening 24 extends radially a substantial distance from the faces of the plate 18, any falling or dislodged particulate material can readily fall through the opening into the bin 25.

With the scrubber of the invention, the particulate material in the hot combustion gas will be removed from the gas and collected on plates 18, and is automatically dislodged from the plates without the use of any external or auxiliary cleaning mechanism.

As the scrubber of the invention does not employ any moving parts, there are no energy costs for operation and no noise generation. Not only is the initial capital expenditure for the scrubber of the invention substantially less than that of typical mechanical types, the maintenance and operational costs are substantially reduced.

Further, the flow of the hot combustion gas through the tortuous path in the scrubber chamber provides a turbulent action to enhance mixing of the air with the gas to thereby ensure complete combustion of the combustibles in the gas.

Figure 6:
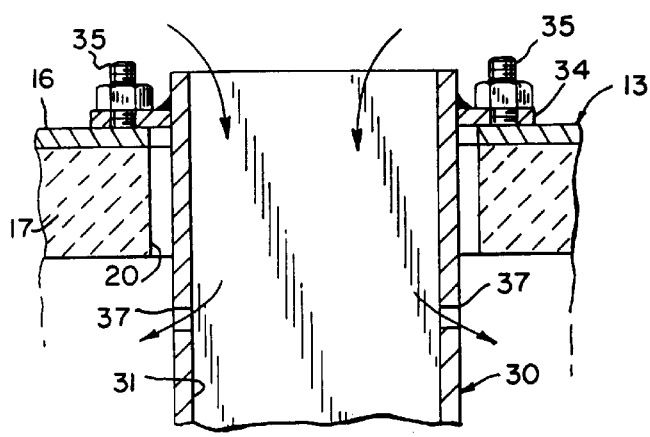
FIG. 6 is a fragmentary vertical section of a second modified o form of the scrubber plate.

FIG. 6 shows a modified form of the invention in which the scrubber incorporates a plurality of elongated metal scrubber plates or members 30, which correspond to the plates 18 of the first embodiment. The scrubber members 30 are formed of a heat resistant metal similar to that of plates 18, and are arranged in a similar pattern within the scrubber chamber as previously described.

Each scrubber member 30 is provided with a central longitudinal passage 31 and the lower end 32 of each passage is closed off as shown in FIG. 6. The upper end of each member 30 projects upwardly through aligned openings 20 in the shell 16 and refractory liner 17 of upper wall 13.

A metal ring 34, preferably formed of steel, is secured to the upper end of the member 30 and the ring is secured to the upper surface of shell 16 through a plurality of bolts 35.

As shown in FIG. 6, the upper end 35 of the central passage 31 of each scrubber member 30 is exposed to the atmosphere, and the scrubber member is provided with a series of outlet ports 37 which are spaced along its length and communicate with the central passage 31. Due to the natural draft of the incineration system, air will be drawn into the upper ends of passages 31 and will be discharged through ports 37 into the scrubber chamber 8. The additional air drawn in through the scrubber members 30 will mix with the combustion gas to ensure complete combustion of the combustibles.

While FIG. 6 has shown air being drawn into the central passages 31 by the draft of the incineration system, it is also contemplated that air can be supplied from a blower through a manifold to the central passage 31 of each of the scrubber members 30.

Figure 7:
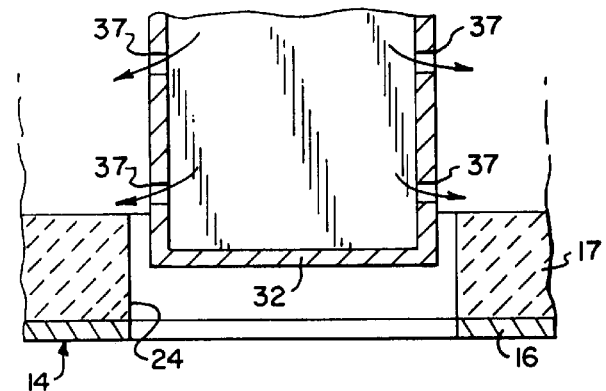
FIG. 7 is a fragmentary vertical section of a second modified form of the scrubber plates.
Figure 7:
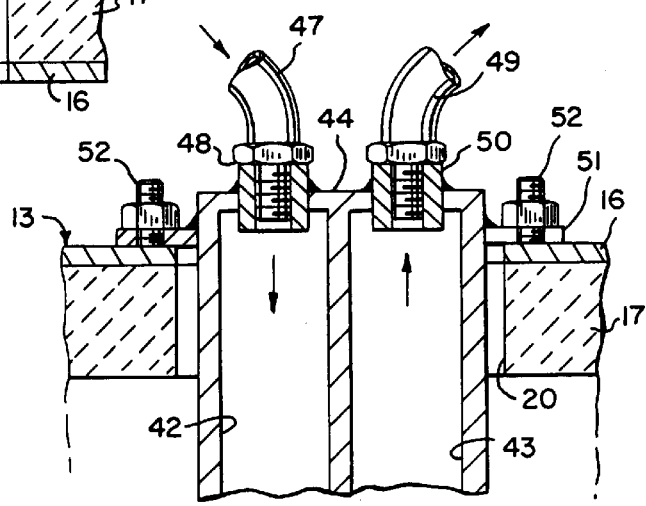
Figure 8:
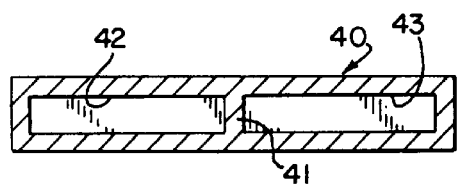
FIG. 8 is a section taken along line 8—8 of FIG. 7.

FIG. 7 illustrates a second modified form of the invention which can be utilized to generate steam for auxiliary purposes. As shown in FIG. 7, a plurality of hollow, elongated scrubber members 40 each formed of a temperature resistant metal, such as Inconel, are suspended within the scrubber chamber. The members 40 can be arranged in a pattern similar to that described with respect to the first embodiment. Located centrally within each member 40 is a longitudinal inner wall 41, which divides the member into an inlet passage 42 and an outlet passage 43. The upper end 44 and lower end 45 of each member 40 are closed and the lower end of the central wall 41 terminates short of the closed lower end 45 to provide a gap 46 that establishes communication between the inlet passage 42 and outlet passage 43.

Water is introduced into the inlet passage 42 through a tube 47 which is connected to a fitting 48 mounted on closed upper end 44. Similarly, heated water is withdrawn from the outlet passage 43 through a tube or conduit 49 which is connected to a fitting 50 on upper end 44.

In a manner similarly described, the upper end of each scrubber member 40 projects upwardly through aligned openings 20 in shell 16 and refractory liner 17, and is secured to the shell 16 through a ring 51. Ring 51 is welded to the outer surface of member 40 and bolts 52 serve to connect the ring to the upper surface of shell 16.

The combustion gas entering the scrubber chamber is normally at a temperature of about 1200° F. to 1500° F, and the water circulating through the passages 42 and 43 in scrubber members 40 is heated and is discharged from the outlet passage 43 at a temperature of about 450° F. The scrubber members 40 in the upstream row at the inlet of the scrubber chamber 8 will be exposed to the highest temperature combustion gas, and by proper sizing of the internal passages 42 and 43, or by control of the volume of water flowing through the passages, the exit temperature of the heated water can be controlled, so that the exit temperature in all plates 40 will be approximately the same. The high temperature water at a temperature of over 400° F. being discharged from the scrubber members 40 can be used as a supply of steam for heating operations in other locations.

Figure 10:
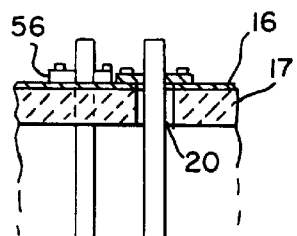
FIG. 10 is a view taken along line 10—10 of FIG. 9.
Figure 9:
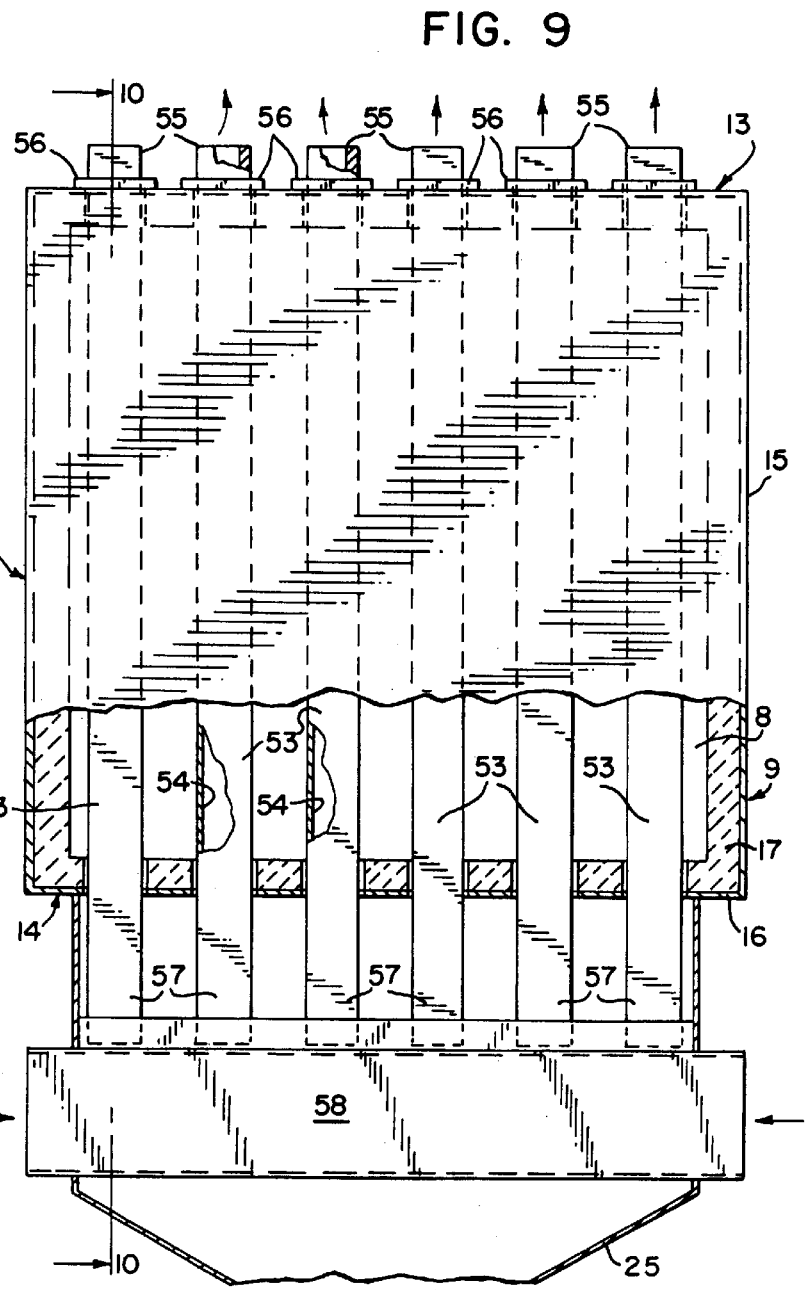
FIG. 9 is a fragmentary transverse section of a further embodiment of the invention showing a modified form of the scrubber plates utilized to cool the combustion gas.

FIGS. 9 and 10 illustrate a further modified form of the invention. As shown in FIG. 9, a plurality of hollow elongated scrubber members or baffles 53, each formed of a heat resistant metal, such as Inconel, are suspended within the scrubber chamber 8 and are arranged in a matter similar to that described in the first embodiment. Each scrubber member 53, which is generally rectangular in cross section, is provided with a longitudinal passage 54 and the open upper end 55 of each scrubber member 53 projects upwardly through aligned openings 20 in shell 16 and refractory liner 17 of top wall 13, and is secured to the shell by means of ring 56. The manner of connecting each scrubber member 53 to the shell 16 is similar to that shown in FIG. 6.

The open lower end 57 of each scrubber member 53 in each row projects freely through the aligned openings 24 in the refractory liner 17 and shell 16 of the lower wall 15 and communicates with a generally horizontal manifolds 58. The ends of manifold 58 project through opposite sides of the collection bin 25, and one or both of the ends of each manifold are exposed to the atmosphere.

As the combustion gas flows through scrubber chamber 8, the particulate material and fly ash will be deposited on the forward and rear surfaces of each scrubber member 53 in the manner previously described. The hot combustion gas will heat the air within the passages 54 of members 53 causing an upward flow of air by convection through the scrubber members, with the air being drawn from the atmosphere into the open ends of the manifolds 58 and then flowing upwardly through passages 54 of scrubber members 53 and being discharged from the open upper ends 55 of the scrubber members. This arrangement serves to cool the combustion gas and has particular use when a bag house is utilized in conjunction with the discharge stack of the incineration system. Cooling of the combustion gas eliminates the need for an auxiliary heat exchanger, which is commonly required in order to cool the combustion gas before it is passed through the bag house.

While FIGS. 9 and 10 illustrate a manifold 58 connected to the scrubber members 53, it is contemplated that the lower open end of each scrubber passage 54 can individually communicate with the atmosphere, or a common manifold can be connected to all the scrubber members 53 in the scrubber chamber. Further, it is also contemplated that a blower or other source of pressurized air or gas can be connected to the longitudinal passages 54 of the scrubber members 53, so that air, or other gas will be forced through the passages rather than flowing by convection.

Figure 11:
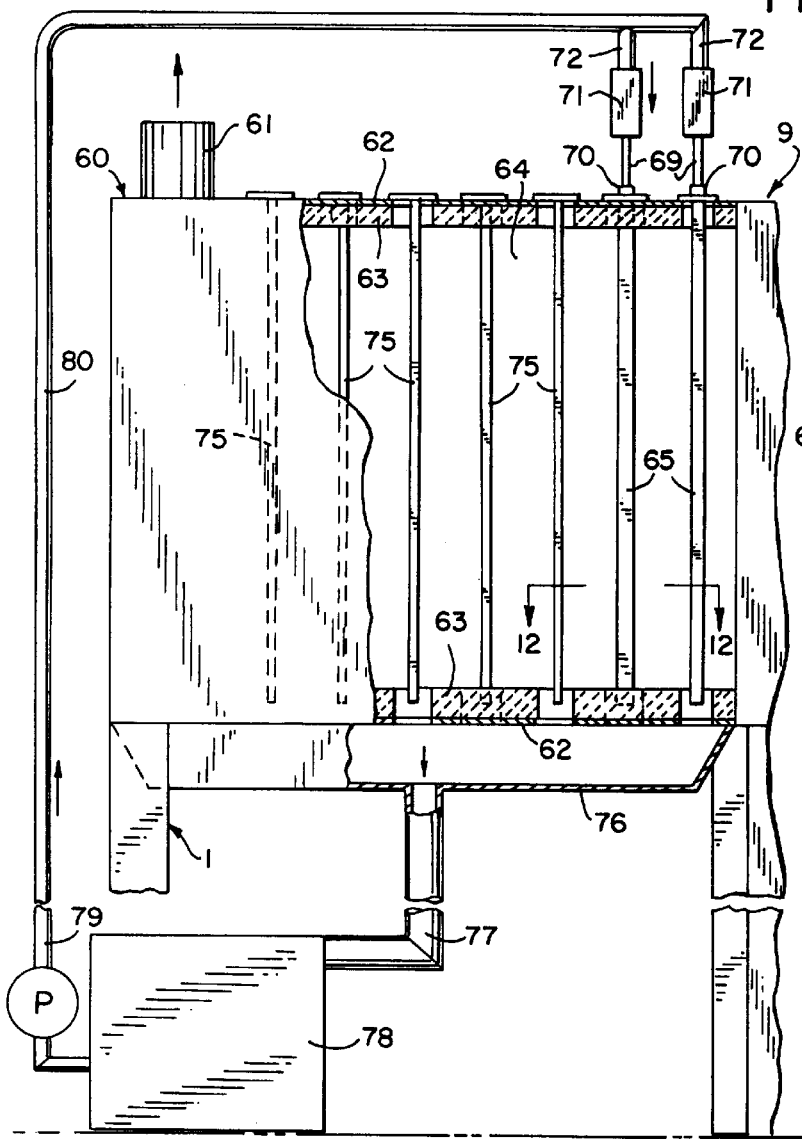
FIG. 11 is a fragmentary side elevation of a modified form of incineration system incorporating a wet scrubber.
Figure 13:
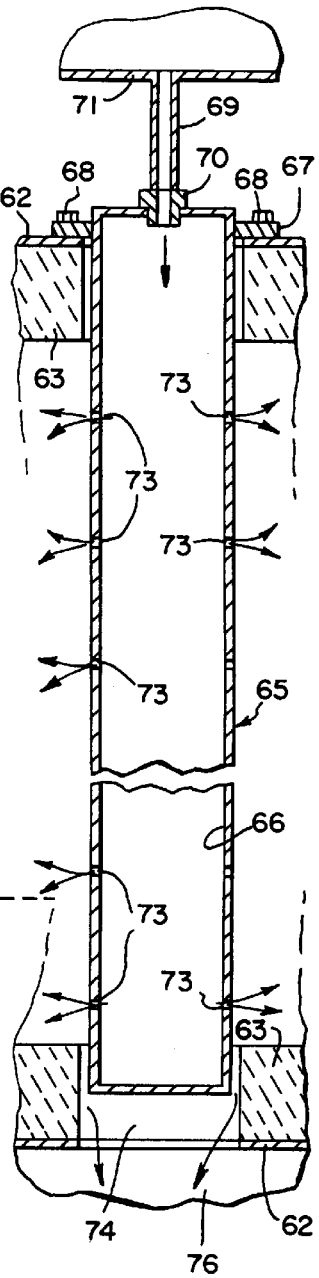
FIG. 13 is a section taken along line 13—13 of FIG. 12.
Figure 12:
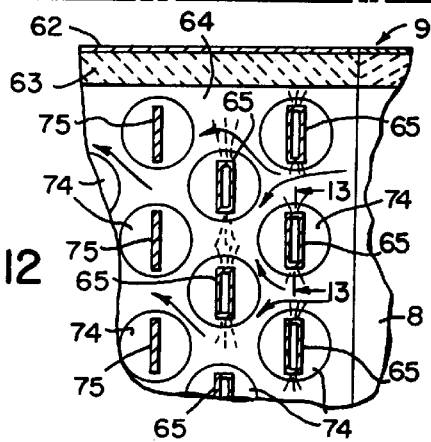
FIG. 12 is a section taken along line 12—12 of FIG. 11.

FIGS. 11–13 illustrate a modified form of the invention incorporating a wet scrubber unit 60. The combustion of certain types of waste material may generate high levels of concentration of hazardous gases, such as hydrogen chloride, hydrogen sulfide, or the like, and in this embodiment, the wet scrubber unit 60 has been substituted for the secondary combustion unit 11 of the first embodiment and is intended to remove such hazardous gases, from the combustion gas. As previously described, the waste material is partially combusted in the combustion chamber of incinerator 2, and additional air is introduced into the combustion gas through the thermal reactor stack 5. The mixture of combustion gas and air is discharged from stack 5 into the secondary combustion unit 6 and then passes through the scrubber unit 9, as previously described. The outlet of the scrubber unit 9 communicates with the wet scrubber unit 60 and after flowing through the wet scrubber unit, the combustion gas is discharged through stack 61 which communicates with the upper end of the wet scrubber unit 60.

Wet scrubber unit 60 is generally box-like in shape and is composed of an outer metal shell, preferably formed of steel 62, and a refractory liner 63. The scrubber unit 60 defines a chamber 64 which communicates with the outlet of the scrubber unit 9.

Suspended within the chamber 64 are a plurality of hollow elongated scrubber members or baffles 65 which are composed of a heat resistant metal, such as Inconel. As best illustrated in FIG. 11, the scrubber members 65 are preferably mounted in two parallel rows, each of which extends transversely of chamber 64.

Scrubber members 65 are similar in construction to the scrubber members previously described, and are generally rectangular in cross section having a front face facing upstream of the gas flow, a rear face, and a pair of side edges. The scrubber members 65 of each row are spaced transversely apart with the spacing being substantially equal to the horizontal width of the scrubber members. As previously described, the scrubber members 65 in the second row are staggered with respect to the scrubber members 65 of the first or upstream row, so that the scrubber members of the second row are aligned with the spaces between the scrubber members of the first row, as best shown in FIG. 12.

Each scrubber member 65 is provided with a longitudinal passage 66, and both the upper and lower ends of the passage 66 are closed.

Each scrubber member 65 is mounted to the upper wall of the scrubber unit 60 in a manner as previously described. More specifically, a ring 67 is welded to the upper end of each scrubber member and each ring is connected to the metal shell 62 through bolts 68.

A fluid, such as water, is introduced into the longitudinal passage 66 of each scrubber member 65 through a water line 69, which is connected to a fitting 70 that is mounted on the upper end of each scrubber member. The lines 69 associated with the scrubber members of each row are connected to a common manifold 71 and water is supplied to the manifolds through lines 72.

As best illustrated in FIG. 13, each side edge of the scrubber members 65 is formed with openings which define jets or nozzles 73. The water flowing within each passage 66 is discharged through the jets 73 in the form of a mist. The water mist being discharged from the jet or nozzles 73 directly intersects the path of flow of the hot combustion gas flowing through the chamber 64, as shown in FIG. 12.

As previously described, the lower ends of scrubber members 65 are not connected to the scrubber unit 60, but are freely mounted within aligned holes 74 formed in the lower wall of the metal shell 62 and in the refractory lining 63, as illustrated in FIG. 13.

In addition to the hollow scrubber members 65, the unit 60 also includes a plurality of parallel rows of scrubber members or baffles 75, which can be similar in construction to scrubber members 18. In practice, five parallel rows of scrubber members 75 can be incorporated. The solid metal scrubber members 75 are arranged in the same pattern as previously described with the spaces between adjacent scrubber members 75 in each row being substantially equal to the width of the scrubber members, and the scrubber member 75 of one row being aligned with the spaces between scrubber members of the next adjacent row.

In operation, a portion of the hot combustion gas after passing through the scrubber unit 9 will impinge against the upstream row of scrubber members 65 in the wet scrubber unit 60. A second portion of the gas will flow around and through the spaces between the scrubber members 65 of the first row, as shown in FIG. 12, into direct contact with the water mist being discharged through the jet 73 in the side edges of the scrubber members. The hot combustion gas will tend to vaporize the water droplets of the mist, generating steam, and hazardous gas components in the combustion gas mixture, such as hydrogen chloride and hydrogen sulfide, will be dissolved in the water droplets and steam. The gas mixture, including the steam and water droplets, will then flow downstream in the wet scrubber unit 60, and impinge against the scrubber members 75, in the down-stream five rows. The steam will tend to condense as it flows through the rows of scrubber members 75, and the condensed water droplets, as well as any particulate material remaining in the combustion gas, will tend to collect on the front and rear surfaces of the scrubber member 75, as previously described. The condensed water and particulate material will then flow downwardly along the front and rear faces of the scrubber members 75 and then through openings 74 to collection trough 76, which is mounted to the lower wall of the scrubber unit, as best illustrated in FIG. 11. The collected water, containing the dissolved hazardous gases, along with particulate material, will then flow from trough 76 through line 77 to a treating tank 78. In FIG. 11, treating tank 78 is shown as a single tank, but in practice, may take the form of a group of tanks which are connected in series. Through conventional treatment in tank 78 the dissolved hazardous gases can be substantially removed from the water and the particulate material can also be removed as a sludge. The effluent from the treatment can then be recirculated from tank 78 by pump 79 through line 80 to lines 72 and then to the manifolds 71, where it is fed back to the wet scrubber members 65. It is contemplated that fresh water, rather than recycled water, can be fed to the scrubber members 65.

The wet scrubber unit 60 as illustrated in FIGS. 11–13 has particular use when the combustion gas mixture contains hazardous gases, such as hydrogen chloride, hydrogen sulfide, sulfur dioxide, and the like. The amount of such hazardous gases depends, of course, on the nature of the waste material being combusted. Thus, in certain installations, the combustion gas mixture may be substantially free of the hazardous gas components, so that the wet scrubber unit 60 would not be required.

While the invention has particular application as a scrubber in an incineration system, it is contemplated that the invention can also be employed to remove particulate material, such as dust or water droplets, from various types of gases.

I claim:

1. A method of incineration, comprising the steps of pyrolytically incinerating waste material in an atmosphere containing a volume of air less than that required for complete combustion to thereby provide combustion gas containing combustible material, discharging the combustion gas from the combustion zone through a stack, supplying air to the combustion gas in the stack to provide a gas mixture, flowing the gas mixture into a first chamber and having a substantially greater cross-sectional area than said stack to thereby reduce the velocity of said gas mixture, flowing the gas mixture from said first chamber into a second chamber having a cross sectional area substantially equal to the cross sectional area of said first chamber, arranging a plurality of spaced elongated baffle members in the second chamber to provide a tortuous path of flow of said gas mixture through said second chamber to thereby aid in mixing said air with said combustion gas and affect substantially complete combustion of said combustible material, depositing particulate material in said gas mixture on said baffle members as said gas mixture flows through said second chamber, dislodging the particulate material from the baffle members, collecting the particulate material dislodged from said baffle members in a collection site, flowing the gas mixture from the second chamber into a third chamber having a cross sectional area substantially equal to the cross sectional area of said second chamber, and discharging said gas mixture from said third chamber.

2. An incineration system for incinerating waste material, comprising a combustion chamber for combusting waste material, means for supplying air to the combustion chamber in a volume less than the air requirements for complete combustion to thereby produce combustion gas containing combustible material, a stack connected to said combustion chamber to receive said combustion gas discharged from said chamber, second air supply means for supplying air to the combustion gas in said stack to provide a gas mixture, secondary combustion means comprising a first chamber connected to said stack and having a substantially greater cross-sectional area than said stack, whereby the velocity of said gas mixture being discharged from said stack to said first chamber will be reduced, a second chamber communicating with said first chamber and having a cross sectional area substantially equal to the cross sectional area of said first chamber, a plurality of elongated baffle members disposed in spaced relation in said second chamber, said baffle members being disposed in a plurality of rows extending transversely of the path of flow of said gas mixture through said second chamber, the spaces between the baffle members of one row being aligned with the baffle members of an adjacent row to provide a tortuous path for the flow of said gas mixture through said second chamber to thereby provide mixing of said air with said combustion gas and effect substantially complete combustion of the combustible material in said gas, particulate material in said combustion gas being deposited on said baffle members, collection means disposed at a lower end of said second chamber for collecting said particulate material dislodged from said baffle members, a third chamber communicating with said second chamber and having a cross sectional area substantially equal to the cross sectional area of said second chamber, and means for discharging combustion gases from said third chamber.

3. The method of claim 2, and including the step of arranging the baffle members in a plurality of generally parallel rows with the spacing between adjacent baffle members in each row being substantially equal to the width of said baffle members.

4. The method of claim 2, and including the step of suspending each baffle member vertically within said second chamber.

5. The method of claim 2, and including the step of arranging the baffle members in said second chamber in a plurality of generally parallel rows extending transversely to the flow of the gas mixture through said second chamber, and staggering the baffle members in said rows whereby the spaces between baffle members of one row are aligned with baffle members of an adjacent row to thereby provide said tortuous path.

6. The system of claim 2, wherein said second chamber includes a top wall and a bottom wall spaced beneath said top wall, said system also including means for suspending said baffle members from said top wall, said bottom wall including a plurality of spaced openings, a lower end of each baffle member being disposed in spaced relation within an opening, whereby paticulate material dislodged from said baffle members will fall through said openings to said collection means.

7. The system of claim 6, in which the first and third chambers are devoid of internal baffling.

8. The system of claim 2, wherein said first and third chambers are free of internal baffles.

\* \* \* \* \*